(12) United States Patent
Kaewell

(10) Patent No.: US 6,587,499 B2
(45) Date of Patent: *Jul. 1, 2003

(54) BASE STATION WHICH USES PRE-ROTATION BEFORE TRANSMISSION

(75) Inventor: John D. Kaewell, Jamison, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/077,632

(22) Filed: Feb. 15, 2002

(65) Prior Publication Data

US 2002/0080857 A1 Jun. 27, 2002

Related U.S. Application Data

(63) Continuation of application No. 09/820,014, filed on Mar. 28, 2001.
(60) Provisional application No. 60/192,670, filed on Mar. 28, 2000.

(51) Int. Cl.⁷ .............................. H04B 1/69; H04B 1/707
(52) U.S. Cl. ...................................................... 375/141
(58) Field of Search ................................. 375/141, 148, 375/130, 146, 147, 150, 343, 341, 219; 455/56.1, 69, 70; 714/786, 794, 795

(56) References Cited

U.S. PATENT DOCUMENTS

| | | | |
|---|---|---|---|
| 4,028,497 A | * | 6/1977 | Saburi ........................ 370/321 |
| 4,328,585 A | * | 5/1982 | Monsen ....................... 375/233 |
| 5,499,236 A | | 3/1996 | Giallorenzi et al. |
| 5,579,338 A | | 11/1996 | Kojima |
| 5,619,524 A | | 4/1997 | Ling et al. |
| 5,659,573 A | | 8/1997 | Bruckert et al. |
| 5,757,865 A | | 5/1998 | Kaku et al. |
| 5,930,288 A | | 7/1999 | Eberhardt |
| 6,028,888 A | | 2/2000 | Roux |
| 6,055,231 A | | 4/2000 | Mesecher et al. |
| 6,272,168 B1 | * | 8/2001 | Lomp et al. ................. 370/342 |
| 6,366,607 B1 | * | 4/2002 | Ozluturk et al. ............ 370/342 |

FOREIGN PATENT DOCUMENTS

| | | |
|---|---|---|
| EP | 0675606 | 10/1995 |
| EP | 0716520 | 6/1996 |
| EP | 0818892 | 1/1998 |
| FR | 2767238 | 2/1999 |

OTHER PUBLICATIONS

Abeta et al., A Coherent Detection System with a Suppressed Pilot Channel for DS/CDMA Systems, Electronics & Communications in Japan, Part I—Communications, vol. 79, Part 1, No. 4, Apr. 1, 1996, pp. 95–102.

* cited by examiner

Primary Examiner—Khai Tran
(74) Attorney, Agent, or Firm—Volpe and Koenig, P.C.

(57) ABSTRACT

The present invention is an apparatus for reducing transmission errors by a base station when transmitting a communication signal. An RF communication signal is received at the base station and analyzed for errors. A correction signal is then generated based upon the analysis. Prior to transmission of the communication signal from the base station, the communication signal is corrected using the correction signal.

2 Claims, 11 Drawing Sheets

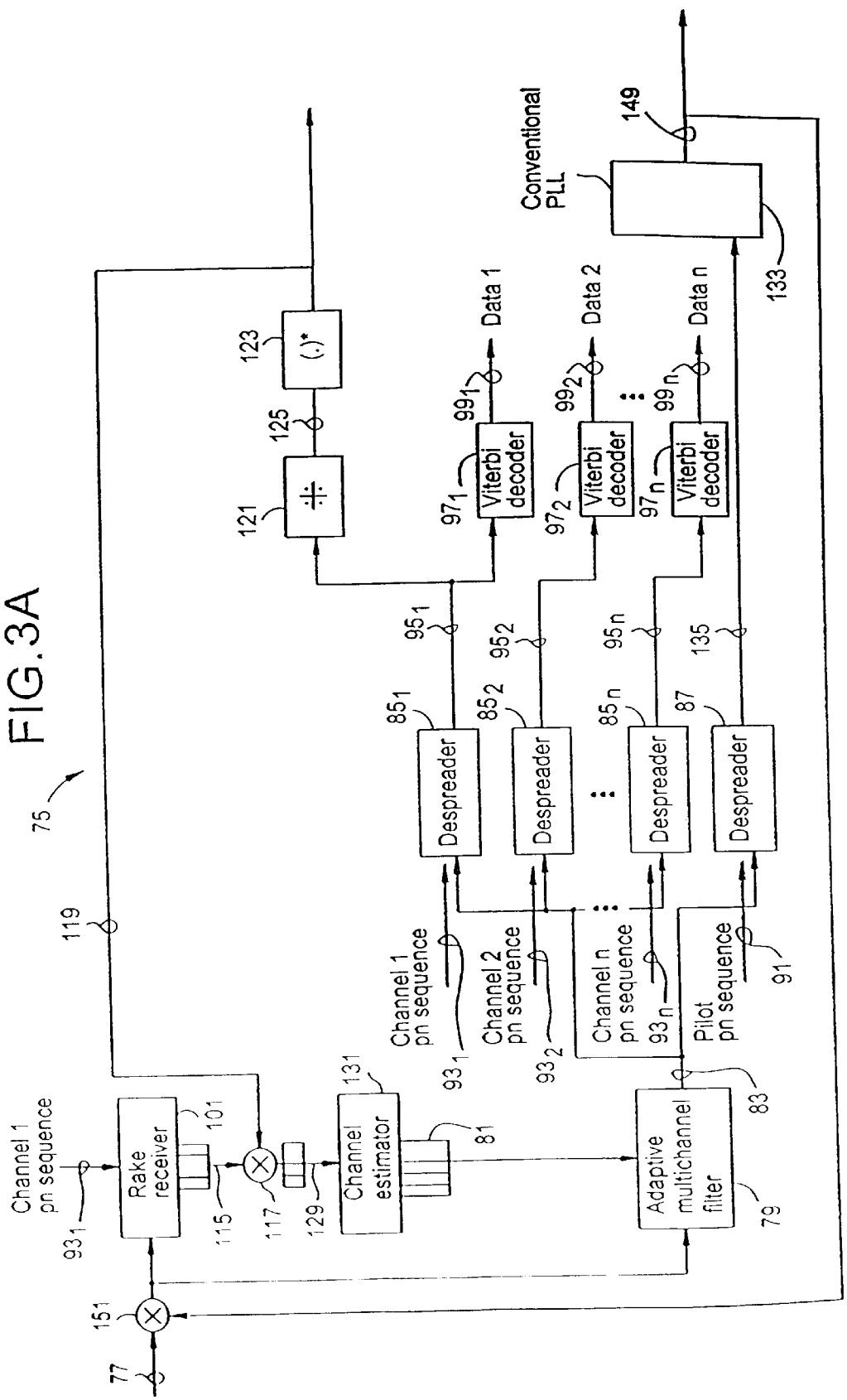

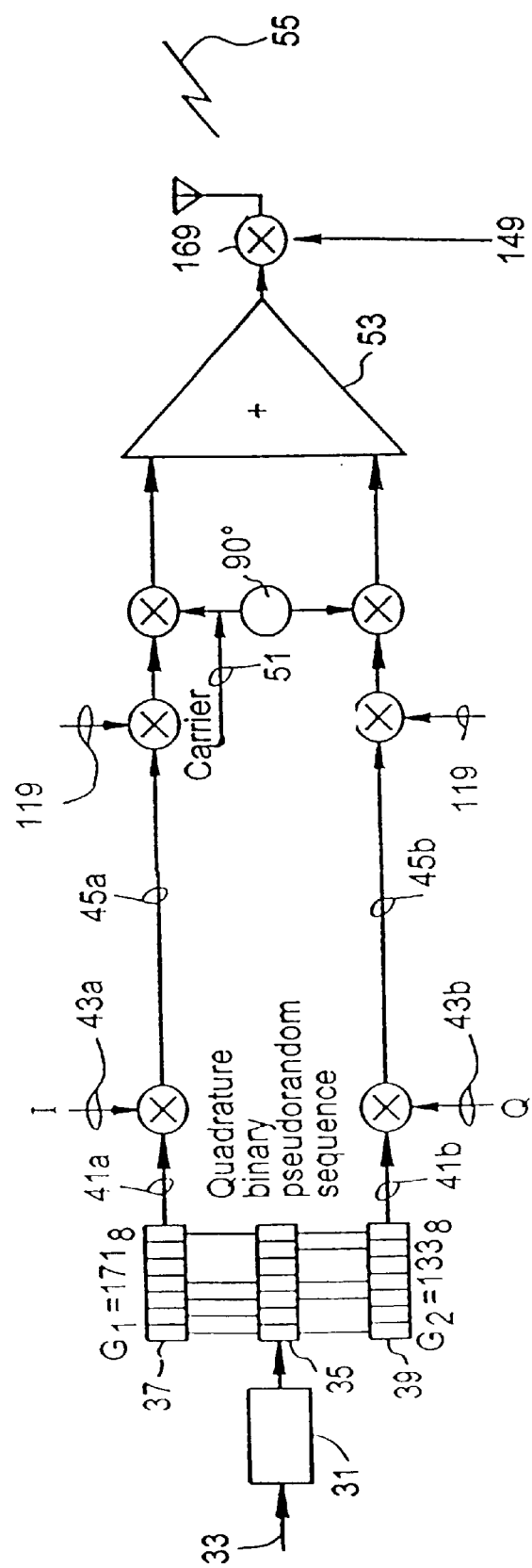

BASE STATION WHICH USES PRE-ROTATION BEFORE TRANSMISSION

CROSS REFERENCE TO RELATED APPLICATIONS

This application is a continuation of application Ser. No. 09/820,014, filed on Mar. 28, 2001; now pending which claims priority from Provisional Application No. 60/192,670, filed on Mar. 28, 2000.

BACKGROUND

The present invention relates generally to digital communications. More specifically, the invention relates to a system and method for pre-rotating a digital spread spectrum signal prior to transmission in order to improve receiver accuracy and recovery of the phase and frequency information by the receiver.

Many current communication systems use digital spread spectrum modulation or code divisional multiple access (CDMA) technology. Digital spread spectrum is a communication technique in which data is transmitted with a broadened band (spread spectrum) by modulating the data to be transmitted with a pseudo-noise signal. CDMA can transmit data without being affected by signal distortion or an interfering frequency in the transmission path.

Shown in FIG. 1 is a simplified CDMA communication system that involves a single communication channel of a given bandwidth which is mixed by a spreading code which repeats a predetermined pattern generated by a pseudo-noise (pn) sequence generator. A data signal is modulated with the pn sequence to produce digital spread spectrum signal. A carrier signal is modulated with the digital spread spectrum signal to establish a forward link and is then transmitted. A receiver demodulates the transmission to extract the digital spread spectrum signal. The same process is repeated to establish a reverse link.

During terrestrial communication, a transmitted signal is typically disturbed by reflections due to varying terrain and environmental conditions and man-made obstructions. Thus, a single transmitted signal produces a plurality of received signals with differing time delays at the receiver, an effect which is commonly known as multipath distortion. During multipath distortion, the signal from each different path arrives delayed at the receiver with a unique amplitude and carrier phase.

In the prior art, the error associated with multipath distortion is typically corrected at the receiver after the signal has been correlated with the matching pn sequence and the transmitted data has been reproduced. Thus, the correlation is completed with error incorporated in the signal. Similar multipath distortion affects the reverse link transmission.

Accordingly, there exists a need for a system that corrects a signal for errors encountered during transmission.

SUMMARY

The present invention is an apparatus for reducing transmission errors by a base station when transmitting a communication signal. An RF communication signal is received at the base station and analyzed for errors. A correction signal is then generated based upon the analysis. Prior to transmission of the communication signal from the base station, the communication signal is corrected using the correction signal.

BRIEF DESCRIPTION OF THE DRAWING(S)

FIG. 3A is a detailed block diagram of the present invention using one pseudo-pilot signal, with carrier-offset correction implemented at the chip level.

FIG. 8A is a simple block diagram of a transmitter in accordance with the preferred embodiment of the present invention.

DETAILED DESCRIPTION OF THE PREFERRED EMBODIMENT(S)

Figure 1:
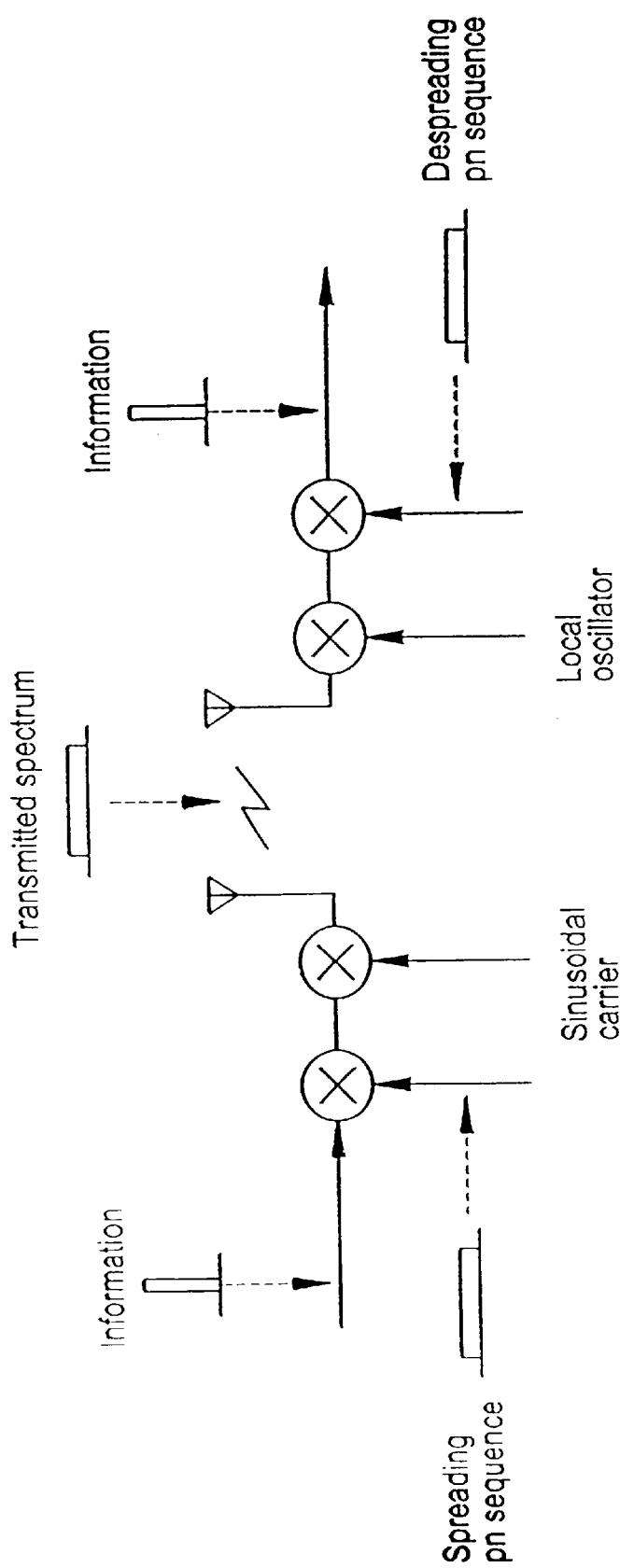
FIG. 1 is a simplified block diagram of a prior art CDMA communication system.

The preferred embodiment will be described with reference to the drawing figures where like numerals represent like elements throughout.

Figure 2:
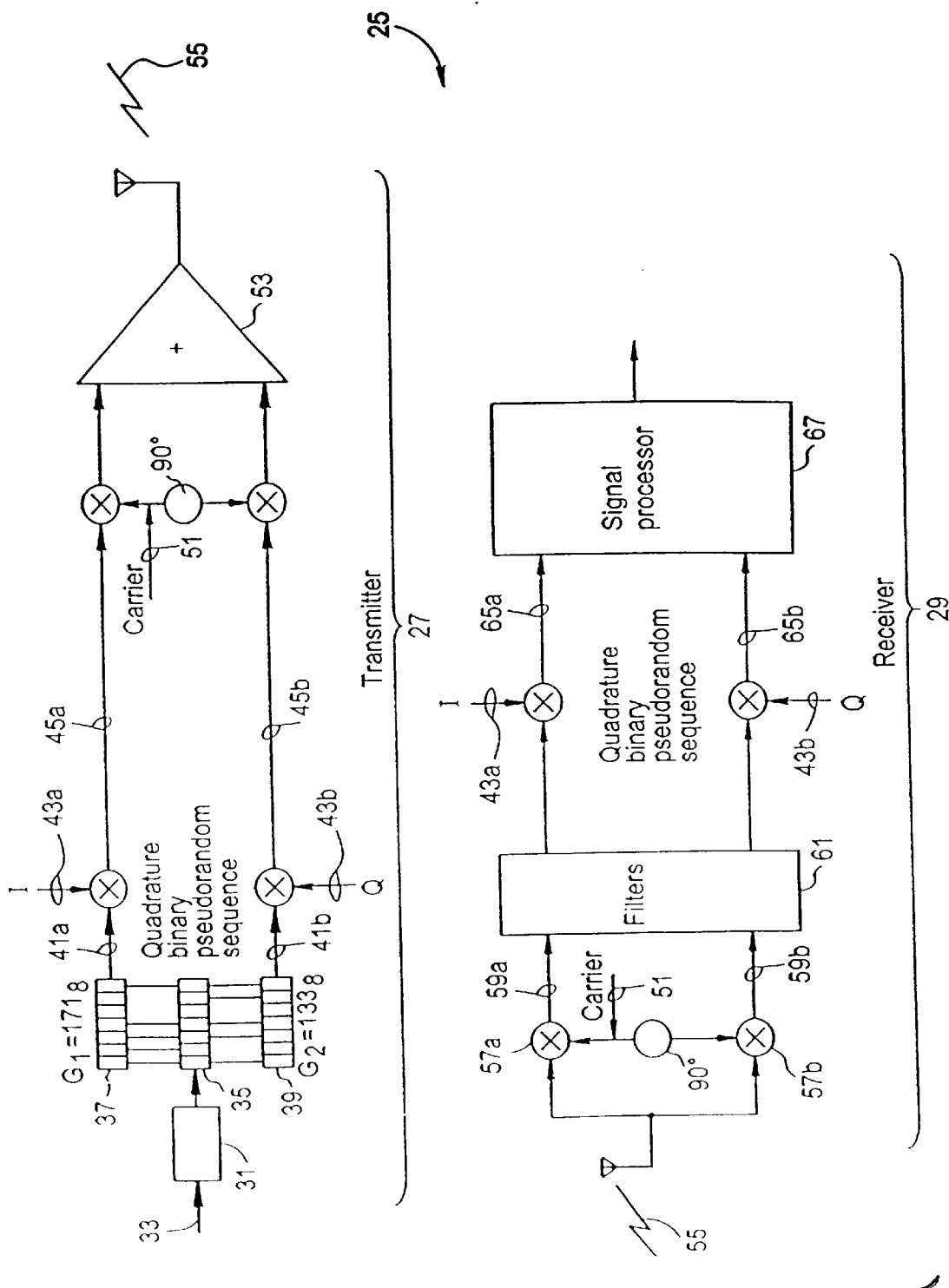
FIG. 2 is a detailed block diagram of a B-CDMA™ communication system.

A CDMA communication system 25 as shown in FIG. 2 includes a transmitter 27 and a receiver 29, which may reside in either a base station or a mobile user receiver. The transmitter 27 includes a signal processor 31 which encodes voice and nonvoice signals 33 into data at various rates, e.g. data rates of 8 kbps, 16 kbps, 32 kbps, or 64 kbps. The signal processor 31 selects a specific data rate depending upon the type of signal, or in response to a set data rate.

By way of background, two steps are involved in the generation of a transmitted signal in a multiple access environment. First, the input data 33 which can be considered a bi-phase modulated signal is encoded using forward error-correction (FEC) coding 35. For example, if a R=½ convolution code is used, the single bi-phase modulated data signal becomes bivariate or two bi-phase modulated signals. One signal is designated the in-phase (I) channel 41a. The other signal is designated the quadrature (Q) channel 41b. A complex number is in the form a+bj, where a and b are real numbers and $j^2=-1$. Bi-phase modulated I and Q signals are usually referred to as quadrature phase shift keying (QPSK). In the preferred embodiment, the tap generator polynomials for a constraint length of K=7 and a convolutional code rate of R=½ are $G_1=171_837$ and $G_2=133_839$.

In the second step, the two bi-phase modulated data or symbols 41a, 41b are spread with a complex pseudo-noise (pn) sequence. The resulting I 45a and Q 45b spread signals are combined 53 with other spread signals (channels) having different spreading codes, mixed with a carrier signal 51 and then transmitted 55. The transmission 55 may contain a plurality of individual channels having different data rates.

The receiver 29 includes a demodulator 57a, 57b which downconverts the transmitted broadband signal 55 into an intermediate frequency signal 59a, 59b. A second downconversion reduces the signal to baseband. The QPSK signal is then filtered 61 and mixed 63a, 63b with the locally generated complex pn sequence 43a, 43b which matches the conjugate of the transmitted complex code. Only the original waveforms which were spread by the same code at the transmitter 27 will be effectively despread. Others will appear as noise to the receiver 29. The data 65a, 65b is then passed onto a signal processor 67 where FEC decoding is performed on the convolutionally encoded data.

When the signal is received and demodulated, the baseband signal is at the chip level. Both the I and Q components of the signal are despread using the conjugate of the pn sequence used during spreading, returning the signal to the symbol level. However, due to carrier offset, phase corruption experienced during transmission manifests itself by distorting the individual chip waveforms. If carrier offset correction is performed at the chip level overall accuracy increases due to the inherent resolution of the chip-level signal. Carrier offset correction may also be performed at the symbol level but with less overall accuracy. However, since the symbol rate is much less than the chip rate, a lower overall processing speed is required when the correction is done at the symbol level.

As shown in FIG. 3A, a receiver using the system 75 and method of the present invention is shown. A complex baseband digital spread spectrum signal 77 comprised of in-phase and quadrature phase components is input and filtered using an adaptive matched filter (AMF) 79 or other adaptive filtering means. The AMF 79 is a transversal filter (finite impulse response) which uses filter coefficients 81 to overlay delayed replicas of the received signal 77 onto each other to provide a filtered signal output 83 having an increased signal-to-noise ratio (SNR). The output 83 of the AMF 79 is coupled to a plurality of channel despreaders $85_1$, $85_2$, $85_n$ and a pilot despreader 87. The pilot signal 89 is despread with a separate despreader 87 and pn sequence 91 contemporaneous with the transmitted data 77 assigned to channels which are despread $85_1$, $85_2$, $85_n$ with pn sequences $93_1$, $93_2$, $93_n$ of their own. After the data channels are despread $85_1$, $85_2$, $85_n$, the data bit streams $95_1$, $95_2$, $95_n$ are coupled to Viterbi decoders $97_1$, $97_2$, $97_n$ and output $99_1$, $99_2$, $99_n$.

The filter coefficients 81, or weights, used in adjusting the AMF 79 are obtained by the demodulation of the individual multipath propagation paths. This operation is performed by a rake receiver 101. The use of a rake receiver 101 to compensate for multipath distortion is well known to those skilled in the communication arts.

Figure 3B:
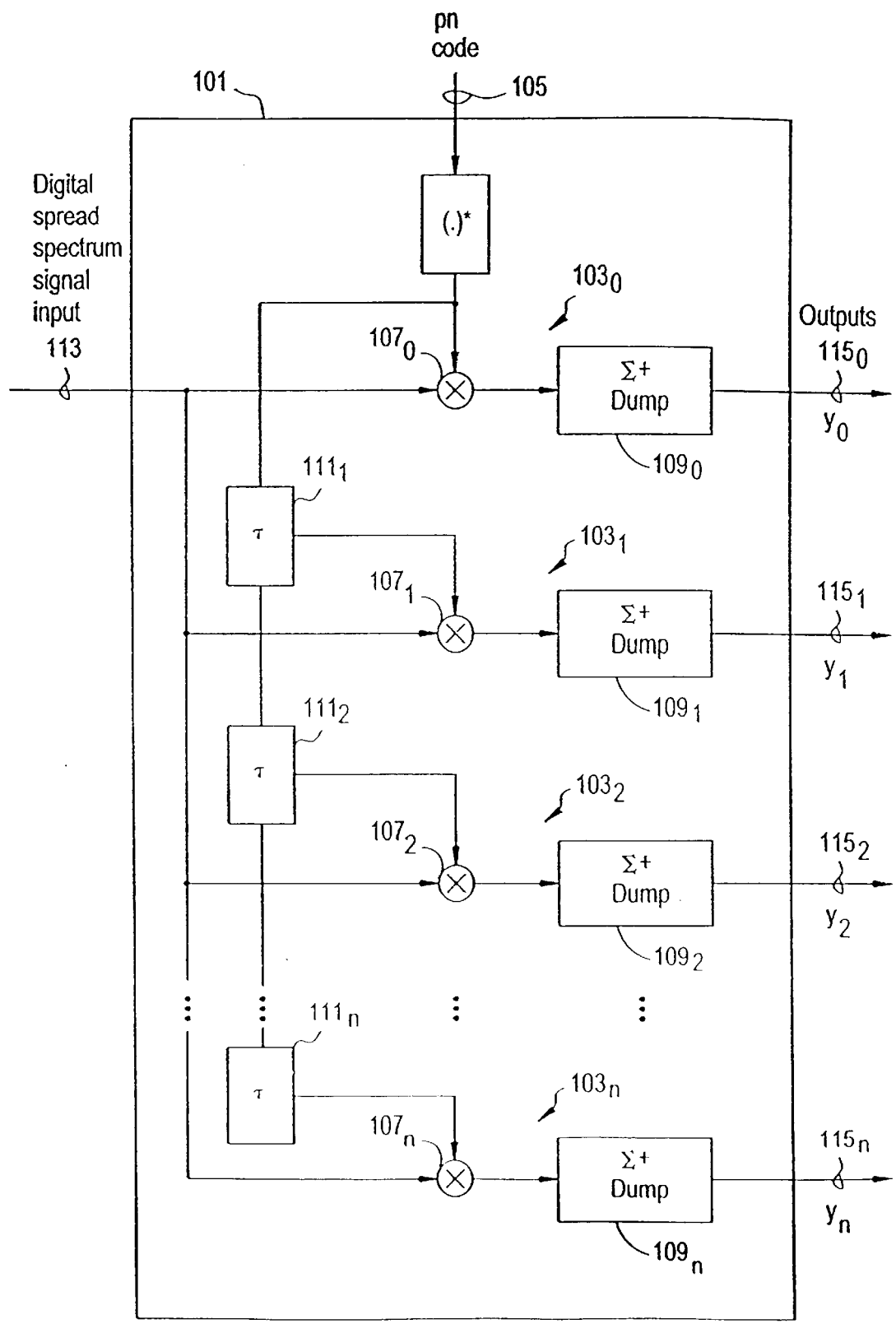
FIG. 3B is a block diagram of a rake receiver.

As shown in FIG. 3B, the rake receiver 101 consists of a parallel combination of path demodulators "fingers" $103_0$, $103_1$, $103_2$, $103_n$ which demodulate a particular multipath component. The pilot sequence tracking loop of a particular demodulator is initiated by the timing estimation of a given path as determined by a pn sequence 105. In the prior art, a pilot signal is used for despreading the individual signals of the rake. In the present invention, the pn sequence 105 may belong to any channel $93_1$ of the communication system. Typically, the channel with the largest received signal is used.

Each path demodulator includes a complex mixer $107_0$, $107_1$, $107_2$, $107_n$, and summer and latch $109_0$, $109_1$, $109_2$, $109_n$. For each rake element, the pn sequence 105 is delayed τ $111_1$, $111_2$, $111_n$ by one chip and mixed $107_1$, $107_2$, $107_n$ with the baseband spread spectrum signal 113 thereby despreading each signal. Each multiplication product is input into an accumulator $109_0$, $109_1$, $109_2$, $109_n$ where it is added to the previous product and latched out after the next symbol-clock cycle. The rake receiver 101 provides relative path values for each multipath component. The plurality of n-dimension outputs $115_0$, $115_1$, $115_2$, $115_n$ provide estimates of the sampled channel impulse response that contain a relative phase error of either 0°, 90°, 180°, or 270°.

Referring back to FIG. 3A, the plurality of outputs from the rake receiver are coupled to an n-dimensional complex mixer 117. Mixed with each rake receiver 101 output 115 is a correction to remove the relative phase error contained in the rake output.

A pilot signal is also a complex QPSK signal, but with the quadrature component set at zero. The error correction 119 signal of the present invention is derived from the despread channel $95_1$ by first performing a hard decision 121 on each of the symbols of the despread signal $95_1$. A hard decision processor 121 determines the QPSK constellation position that is closest to the despread symbol value.

Figure 4:
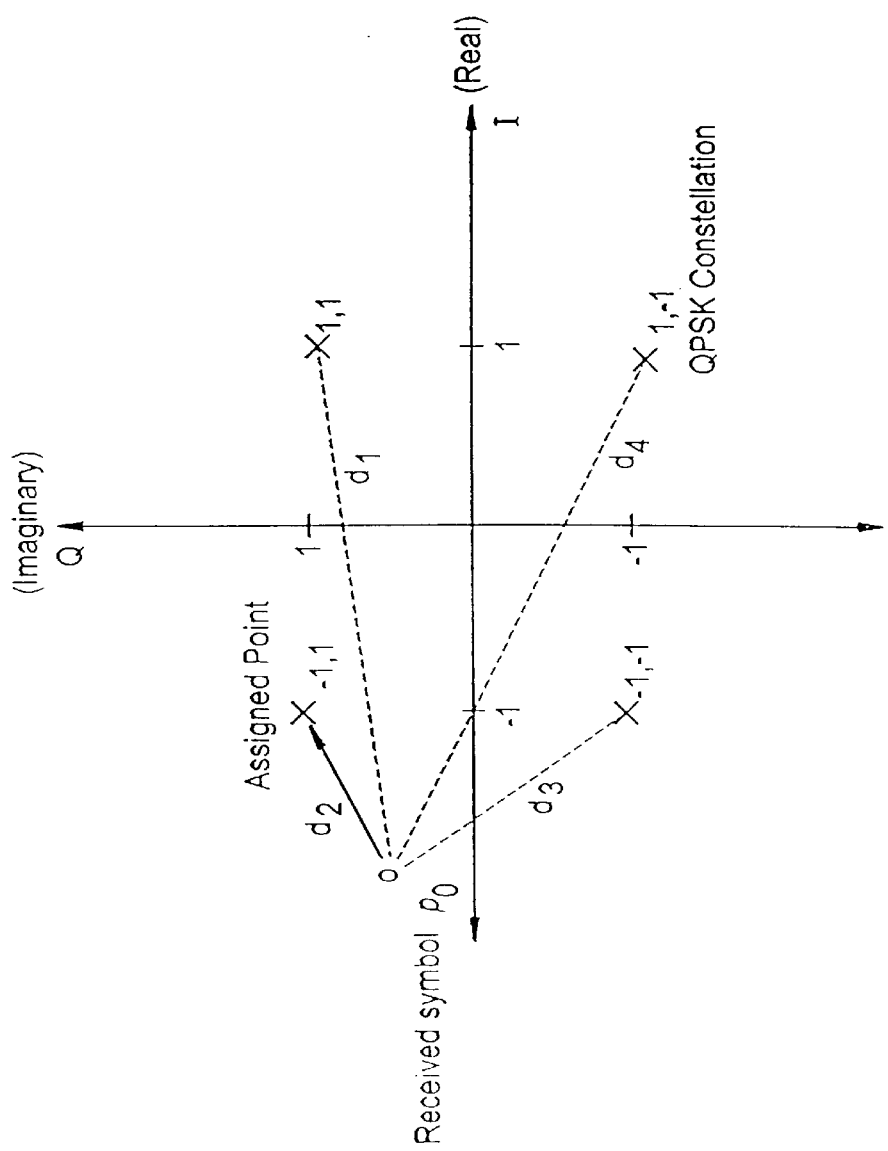
FIG. 4 is a diagram of a received symbol $p_o$ on the QPSK constellation showing a hard decision.

As shown in FIG. 4, the Euclidean distance processor compares a received symbol $p_o$ of channel 1 to the four QPSK constellation points $x_{1,1}$, $x_{-1,1}$, $x_{-1,-1}$, $x_{1,-1}$. It is necessary to examine each received symbol $p_o$ due to corruption during transmission 55 by noise and distortion, whether multipath or radio frequency. The hard decision processor 121 computes the four distances $d_1$, $d_2$, $d_3$, $d_4$ to each quadrant from the received symbol $p_o$ and chooses the shortest distance $d_2$ and assigns that symbol location $x_{-1,1}$. The original symbol coordinates $p_o$ are discarded.

Figure 5:
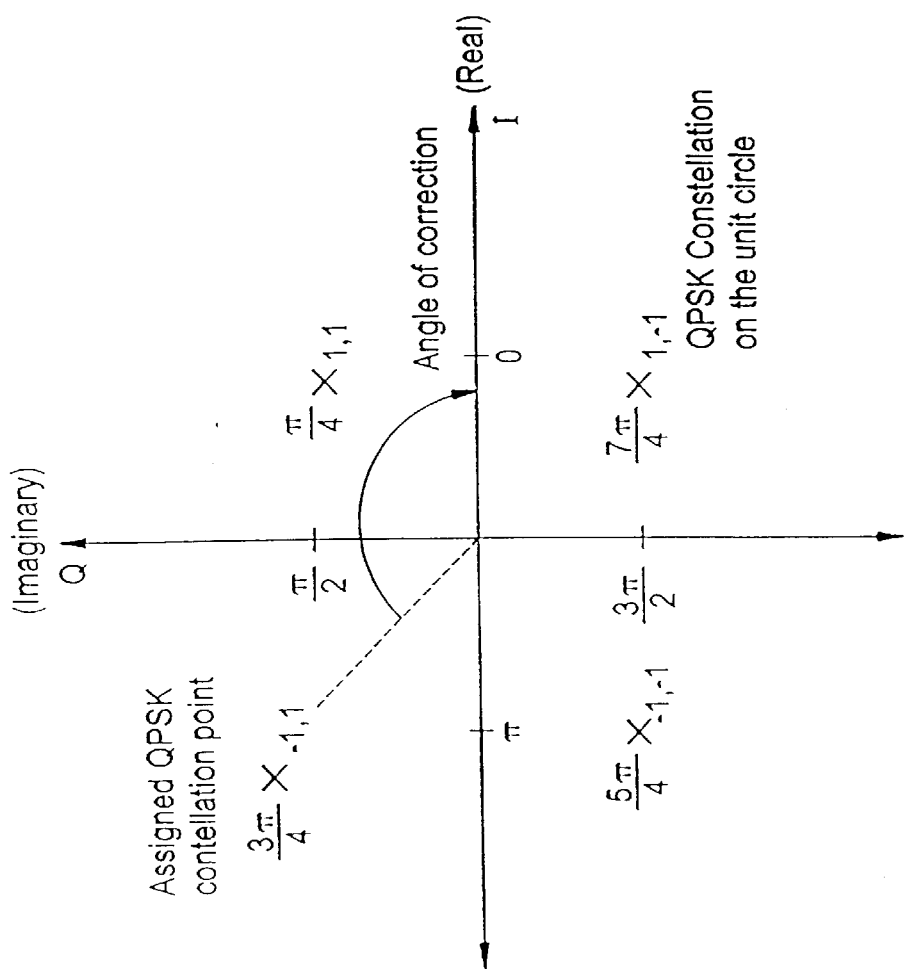
FIG. 5 is a diagram of the angle of correction corresponding to the assigned symbol.

Referring back to FIG. 3A, after undergoing each hard symbol decision 121, the complex conjugates 123 for each symbol output 125 are determined. A complex conjugate is one of a pair of complex numbers with identical real parts and with imaginary parts differing only in sign. As shown in FIG. 5, a symbol is demodulated or de-rotated by first determining the complex conjugate of the assigned symbol coordinates $x_{-1,-1}$, forming the correction signal 119 which is used to remove the relative phase error contained in the rake output. Thus, the rake output is effectively de-rotated by the angle associated with the hard decision, removing the relative phase error. This operation effectively provides a rake that is driven by a pilot signal, but without an absolute phase reference.

Figure 6:
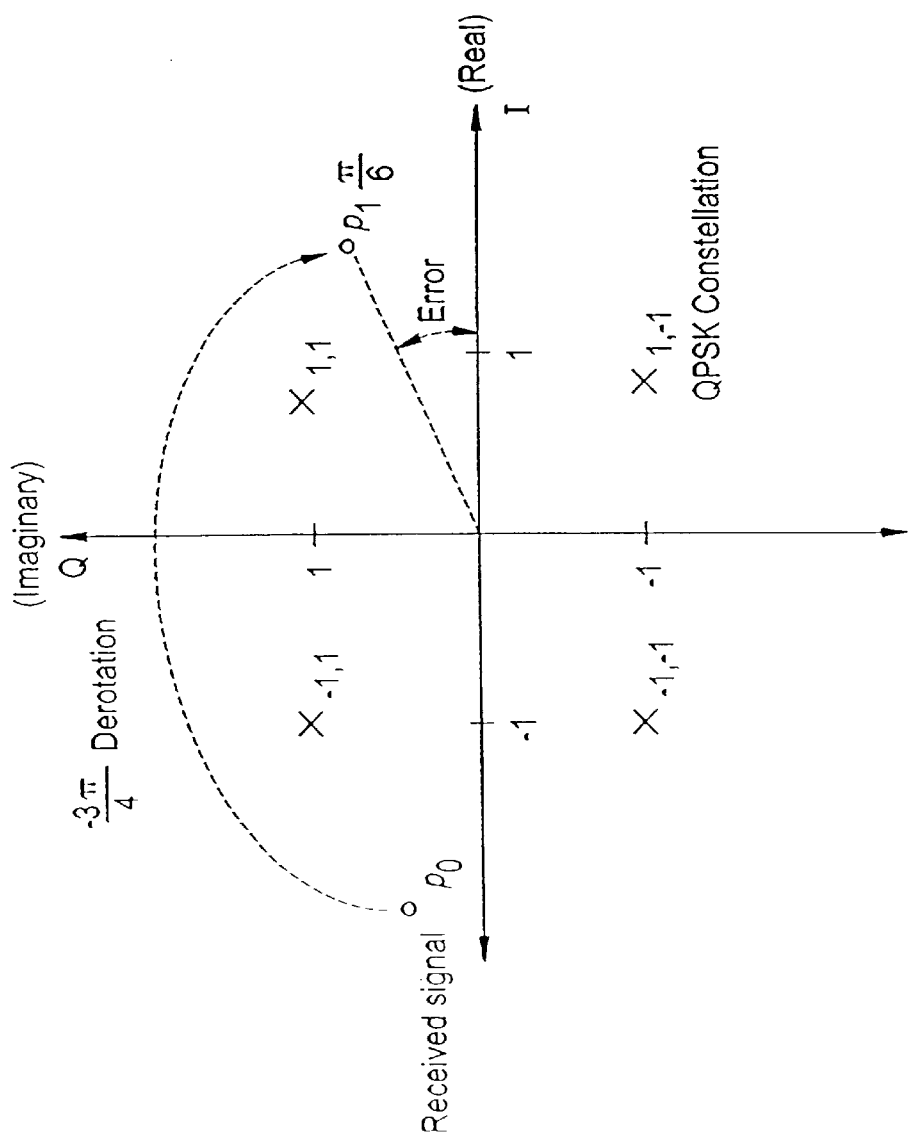
FIG. 6 is a diagram of the resultant symbol error after applying the correction corresponding to the assigned symbol.

Referring back to FIG. 3A, the output 119 from the complex conjugate 123 is coupled to a complex n-dimensional mixer 117 where each output of the rake receiver 101 is mixed with the correction signal 119. The resulting products 127 are noisy estimates of the channel impulse response $p_1$ as shown in FIG. 6. The error shown in FIG. 6 is indicated by a radian distance of π/6 from the in-phase axis.

Referring back to FIG. 3A, the outputs 115 of the complex n-dimensional channel mixer 117 are coupled to an n-dimensional estimator 131. The channel estimator 131 is a plurality of low-pass filters, each for filtering a multipath component. The outputs 81 of the n-dimensional estimator 131 are coupled to the AMF 79. These outputs 81 act as the AMF 79 filter weights. The AMF 79 filters the baseband signal to compensate for channel distortion due to multipath without requiring a large magnitude pilot signal.

Figure 7:
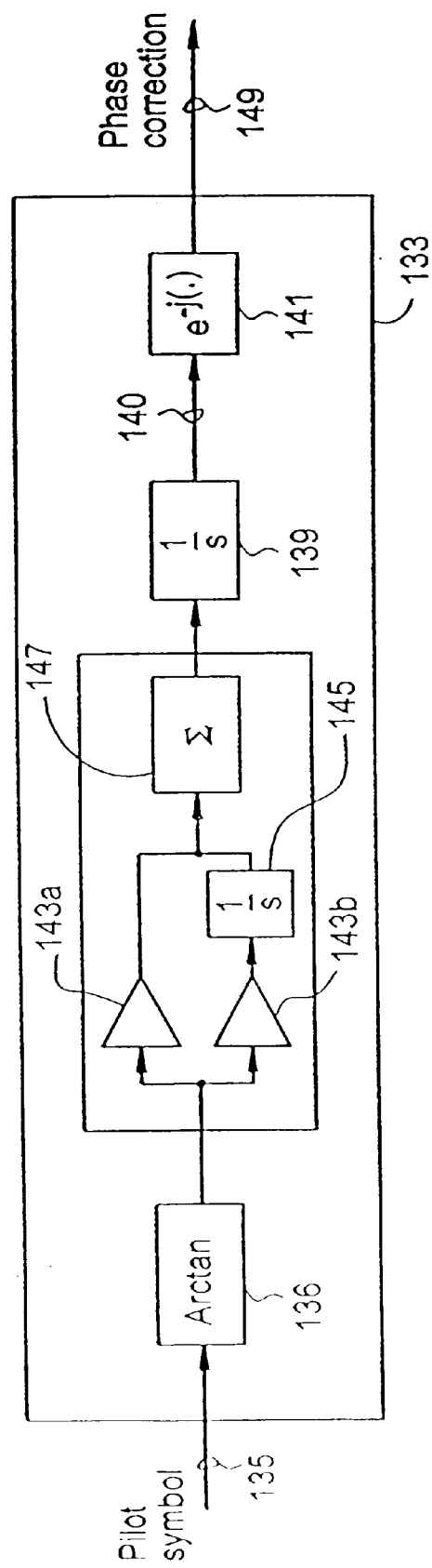
FIG. 7 is a block diagram of a conventional phase-locked loop.

The rake receiver 101 is used in conjunction with the phase-locked loop (PLL) 133 circuits to remove carrier offset. Carrier offset occurs as a result of transmitter/receiver component mismatches and other RF distortion. The present invention 75 uses a low level pilot signal 135 which is produced by despreading 87 the pilot from the baseband signal 77 with a pilot pn sequence 91. The pilot signal is coupled to a single input PLL 133, shown in FIG. 7. The PLL 133 measures the phase difference between the pilot signal 135 and a reference phase of 0. The despread pilot signal 135 is the actual error signal coupled to the PLL 133.

The PLL 133 includes an arctangent analyzer 136, complex filter 137, an integrator 139 and a phase-to-complex-number converter 141. The pilot signal 135 is the error signal input to the PLL 133 and is coupled to the complex filter 137. The complex filter 137 includes two gain stages, an integrator 145 and a summer 147. The output from the complex filter 137 is coupled to the integrator 139. The integral of frequency is phase, which is output 140 to the converter 141. The phase output 140 is coupled to a converter 141 which converts the phase signal into a complex signal for mixing 151 with the baseband signal 77. Since the upstream operations are commutative, the output 149 of the PLL 133 is also the feedback loop into the system 75.

The correction signal 119 of the complex conjugate 123 and the output signal 149 of the PLL 133 are each coupled to mixers located within the transmitter 181, in order to correct the signal before transmission as shown in FIG. 8A. The transmitter 181 shown in FIG. 8A operates in a similar manner to the transmitter 27 shown in FIG. 2, except that the signal ready for transmission is pre-rotated prior to transmission. Referring to FIG. 8A, data $164_1$, $164_2$, $164_3$ is encoded using forward correcting coding (FEC) 35. The two bi-phase modulated data or symbols 41a, 41b are spread with a complex pseudo-noise (pn) sequence and the resulting I 45a and Q 45b spread signals are mixed with the correction signal 119, upconverted with the carrier signal 51, and combined 53 with other spread signals having different spreading codes. The resulting signal 55 is again corrected using the signal 149 from the receiver PLL 133. The signal 56 which has been pre-corrected for phase and frequency is then transmitted. In this manner, the present invention utilizes the signals 119, 149 generated by the receiver 71 to pre-correct the transmitted signal and reduce the phase and frequency errors in the signals as received at the receiving unit.

Figure 8B:
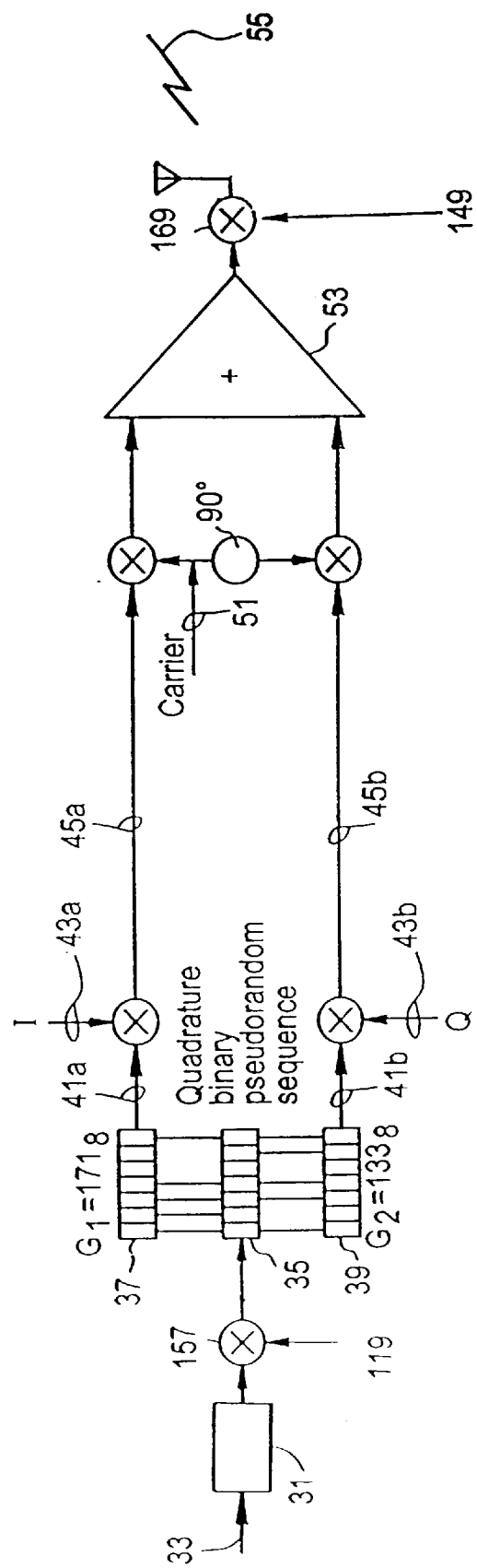
FIG. 8B is a simple block diagram of a transmitter in accordance with an alternative embodiment of the present invention.

Referring to FIG. 8B, a transmitter 183 made in accordance with an alternative embodiment of the present invention is shown. This embodiment is similar to the embodiment shown in FIG. 8A, except that the correction signal 119 is mixed with the baseband data signal via a mixer 157. Thus, the baseband data is pre-corrected prior to encoding and spreading. Of course, those of skill in the art should realize that other processing steps may be introduced before the correction signal 119 is mixed with the data signal.

Figure 8C:
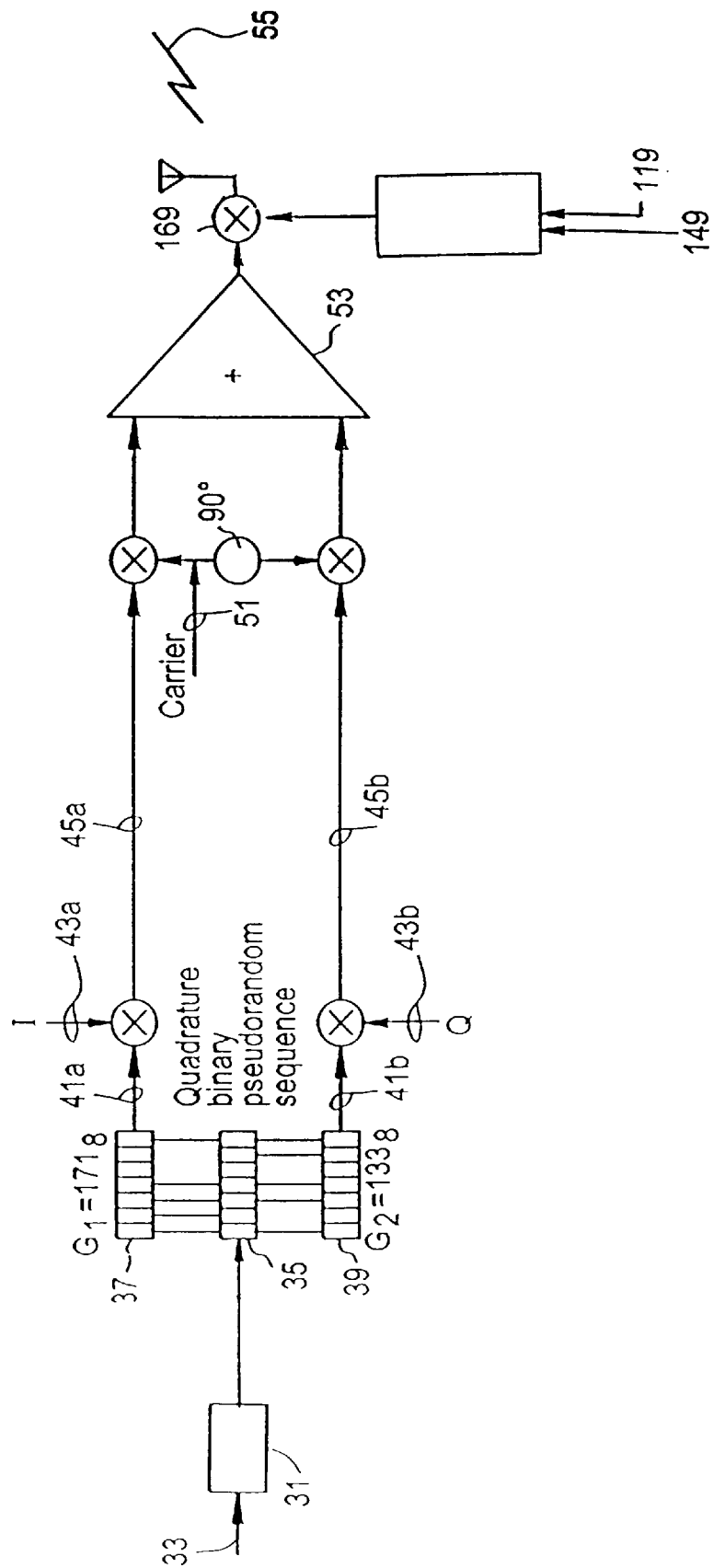
FIG. 8C is a simple block diagram of a transmitter in accordance with an alternative embodiment of the present invention.

Referring to FIG. 8C, a transmitter 188 made in accordance with another alternative embodiment of the present invention is shown. In this embodiment, the correction signal 119 and the carrier offset signal 149 are input into a combiner, which combines the signal into a single pre-correction signal, and mixed using the mixer 169 with the output of the summer 53 prior to transmission.

Finally, it should be noted that the carrier offset correction and the pre-rotation correction are separate corrections. Each may be utilized independently of the other. For example, the system may pre-correct only for carrier offset error and may not perform pre-rotation. Alternatively, the system may perform pre-rotation but may not correct for carrier offset error.

While specific embodiments of the present invention have been shown and described, many modifications and variations could be made by one skilled in the art without departing from the spirit and scope of the invention. The above description serves to illustrate and not limit the particular form in any way.

What is claimed is:

1. A base station for transmitting and receiving communication signals, comprising a receiver and transmitter, for reducing transmission errors in said transmitted signal, the receiver including:

an antenna for receiving a communication signal;

an adaptive matched filter for filtering said received signal to generate a filtered signal using a weighting signal;

an analyzer for analyzing said received signal for errors and generating a correction signal based on said analysis, and said analyzer further includes:
  at least one despreader for despreading said filtered signal using a pilot signal;
  a processor for performing a hard decision on said despread filtered signal and generating symbol outputs therefrom; and
  a conjugator for determining the complex conjugates of said symbol outputs to generate said correction signal;

a correction unit for correcting said received signal using said correction signal; and whereby said transmitter is responsive to said correction unit, for correcting said transmitted signal prior to transmission.

2. The base station of claim 1 wherein said correction unit comprises:

a RAKE receiver for demodulating said received signal and generating relative path values for each multipath component of said received signal; and a mixer for mixing said path values with said correction signal to generate said weighting signal.

* * * * *